Figure 1:
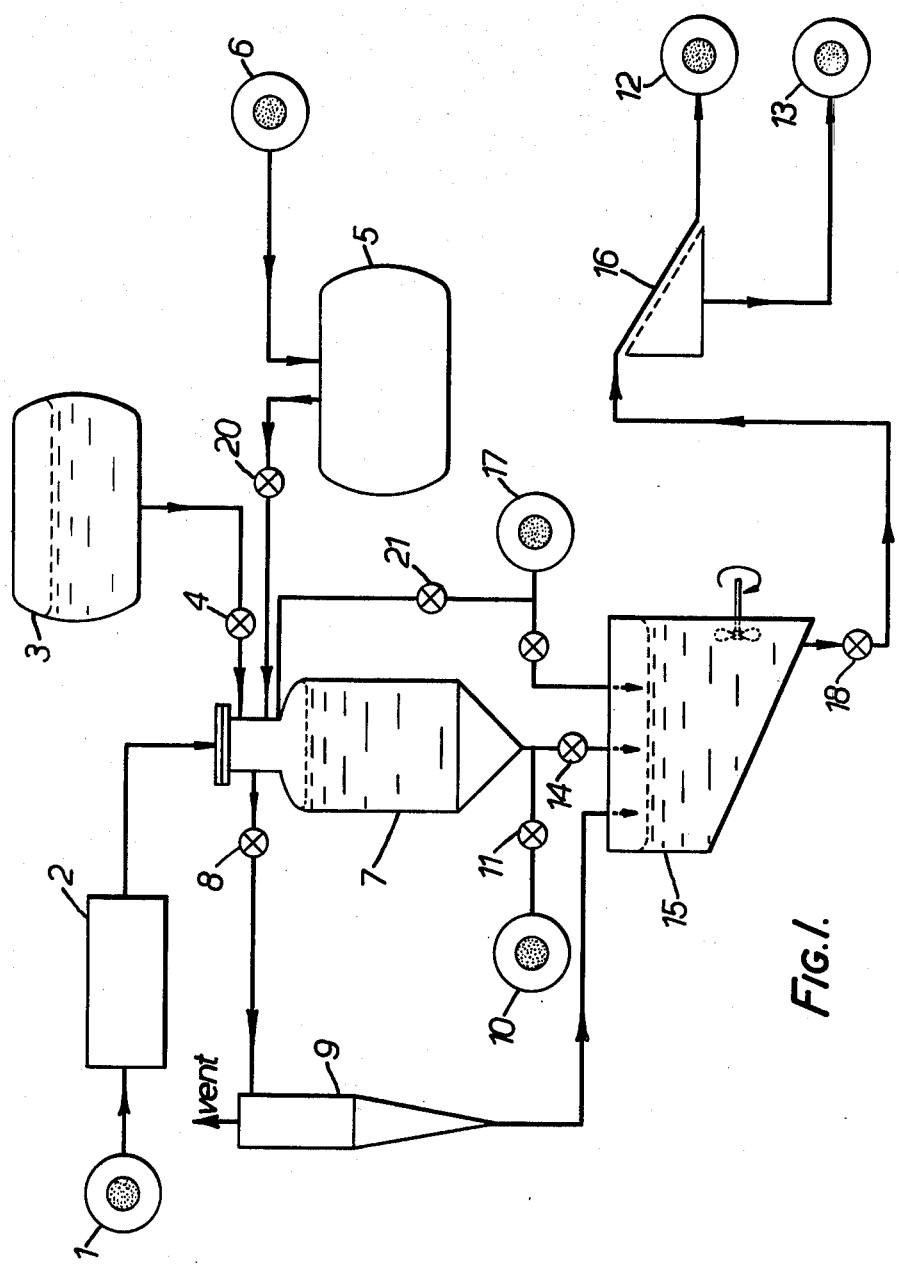

United States Patent [19]

Mamers et al.

[11] 4,188,259

[45] Feb. 12, 1980

[54] RECOVERY OF FIBRE FROM LAMINATED CARTON BOARDS

[75] Inventors: Heikki Mamers, Seaford; John E. Rowney, St. Albans, both of Australia

[73] Assignee: Commonwealth Scientific and Industrial Research Organization, Campbell, Australia

[21] Appl. No.: 850,519

[22] Filed: Nov. 11, 1977

[30] Foreign Application Priority Data

Nov. 11, 1976 [AU] Australia .............................. 8104/69

[51] Int. Cl.$^2$ .......................... D21B 1/32; D21B 1/36
[52] U.S. Cl. .......................................... 162/4; 162/5; 162/8; 162/55; 162/21
[58] Field of Search ..................... 162/4, 5, 6, 7, 8, 21, 162/55; 209/3, 11

[56] References Cited

FOREIGN PATENT DOCUMENTS 695881 10/1964 Canada ........................................ 162/4

OTHER PUBLICATIONS

Tapp, vol. 58, No. 5, pp. 71-73, May 1975.

Primary Examiner—S. Leon Bashore
Assistant Examiner—William F. Smith
Attorney, Agent, or Firm—Sughrue, Rothwell, Mion, Zinn and Macpeak

[57] ABSTRACT

A method for recovering cellulosic fibres from thermoplastic-fibreboard laminates such as fruit juice and milk cartons. The method involves heating the laminate in a pulping liquor to a temperature equal to or greater than the softening point of the thermoplastic material. This is followed by cooling to a temperature below the softening point and defibration by mechanical or explosive means. The method results in a mixture of thermoplastic fragments and cellulosic fibres which can be readily separated by conventional means. Pressure may be applied to the laminate/liquor system to accelerate the process.

30 Claims, 1 Drawing Figure

RECOVERY OF FIBRE FROM LAMINATED CARTON BOARDS

The present invention relates to a method for recovering cellulosic fibres from thermoplastic-fibreboard laminates.

Thermoplastic-fibreboard laminates are finding increasing use for moist product packaging. Examples of such applications include packages for fruit juices, milk and ice-cream.

Structurally, the laminates consist of a core layer of cellulosic fibres faced on one or both sides with a thin film of thermoplastic material such as polyethylene or polypropylene. The core layer of cellulosic fibres also frequently contains fillers such as clay and titanium dioxide, and is also frequently further bonded by synthetic or natural wet strength resins. In cartons made from such laminates, the core layer of cellulosic fibres provides strength and rigidity to the carton whilst the thermoplastic layer or layers provide a moisture resisting barrier.

The cellulosic core layer of thermoplastic-fibreboard laminates is generally manufactured from high quality raw materials such as bleached Kraft or Sulphite pulps. Hence, cellulosic fibres recycled from scrap or reject thermoplastic laminated carton boards represent a potentially valuable source of raw material for the paper and board industry. However, in practical terms, the very factors of high moisture resistance and stability which make the thermoplastic-fibreboard laminates attractive for moist product packaging also make them difficult to recycle by previously disclosed methods.

The problems of recycling the cellulosic fibre of thermoplastic-fibreboard laminates may be summarized as follows:

(1) The thermoplastic layer or layers of the laminated boards prevent ready access of water and repulping chemicals into the cellulosic core layer. Thus, when the material is introduced into a wastepaper reslushing machine such as a "Hydrapulper" (see A. J. Felton, Tappi, Vol. 58, No. 5, pages 71–73, May 1975) intense shear conditions are needed to peel the thermoplastic layer or layers from the cellulosic core layer and thus provide access for the water and repulping chemicals.

(2) The intense shear conditions required in the Hydrapulper inevitably cause some fragmentation of the thermoplastic layers. These small fragments of thermoplastic remain intimately mixed with the recovered cellulosic fibres and are difficult to separate in the subsequent cleaning and screening operations performed upon the reslushed pulp.

(3) The rate of hydrolysis of the wet strength resins associated with the cellulosic core layer is slow at Hydrapulper operating temperatures which, from the open design of the Hydrapulper, are generally restricted to a maximum of some 85° C. Hence, long operating times (of the order of several hours) and a large excess of repulping chemicals are required for the individual fibres to be liberated from the cellulosic core layer.

It has now been discovered that when thermoplastic-fibreboard laminates are submerged in an aqueous medium and heated to a temperature equal to or greater than the minimum softening point of the thermoplastic material, the thermoplastic material shrinks and pulls away from the underlying cellulosic core layer. This exposes the core layer to the aqueous medium and rapid wetting of the cellulosic core layer occurs. The process of wetting may be further accelerated by applying external pressure to the submerged laminate.

The submerged laminate is then maintained at an elevated temperature for a sufficient period of time for any wet strength resins present in the laminate to be weakened or solubilized by reaction with the aqueous medium and with any pulping chemicals dissolved in the aqueous medium. During this reaction period swelling of the cellulosic fibres also occurs which further serves to disrupt the integrity of the cellulosic core layer.

At the end of the reaction period, the product is cooled to a temperature below the minimum softening point of the thermoplastic material and defibration of the product is completed by mechanical agitation. The agitation conditions are controlled to give liberation of the cellulosic fibres from the treated cellulosic core layer whilst inflicting minimum damage upon the thermoplastic material also present.

The mixture of paper pulp and thermoplastic material produced after the mechanical agitation is then further processed by known pulp cleaning techniques to yield a cellulosic fibre pulp stream substantially free of thermoplastic material and a thermoplastic material stream substantially free of cellulosic fibres.

Accordingly, the present invention provides a method for recovering cellulosic fibres from a laminate having a cellulosic fibre layer and a layer of thermoplastic material, which method comprises the steps of:

(i) placing the laminate in contact with a pulping liquor,
(ii) heating the thus contacted laminate to a temperature greater than or equal to the softening point of the thermoplastic material and maintaining the temperature for a time to sufficiently weaken the laminate structure,
(iii) cooling the laminate to a temperature below the softening point of the thermoplastic material,
(iv) subjecting the laminate to defibration forces to provide a mixture of thermoplastic fragments and cellulosic fibres, and
(v) separating the thermoplastic fragments from the cellulosic fibres to thereby recover the cellulosic fibres.

Thus the invention achieves ready breaching of the moisture resisting integrity of the thermoplastic layer or layers of thermoplastic-fibreboard laminates, the rapid introduction of water and any dissolved pulping chemicals into the exposed cellulosic core layer, the rapid destroying of the integrity of any wet strength resins associated with the cellulosic core layer, and completion of the defibration of the laminate under conditions which inflict minimal damage to the thermoplastic material whilst liberating the cellulosic fibres to give a mixture of pulp and thermoplastic material from which the thermoplastic material may be readily separated by established pulp cleaning techniques.

The laminate is preferably completely immersed in the pulping liquor to ensure adequate wetting and to provide an ample medium for any wet strength resins and the like to be dissolved in.

The system may be pressurized either prior to, simultaneously with or subsequent to the heating step to increase the rate of digestion of the laminate in the pulping liquor.

The defibration forces may be provided by rapidly discharging the weakened laminate to a lower pressure environment. Alternatively, conventional mechanical devices may be used to provide the defibration forces. Alternatively, the defibration forces may be provided by a combination of rapid discharge of the weakened laminate followed by agitation by conventional mechanical devices.

Preferred aspects of the invention will now be described with reference to the accompanying drawing which depicts a schematic representation of a system for recovering cellulosic fibres from thermoplastic-fibreboard laminates. It will be appreciated that the following discussion is not concerned with the only manner of putting the invention into practice as details of peripheral equipment, digester design and matters described hereinafter may be altered without affecting the principle of the invention.

Referring to the drawing, thermoplastic laminated carton board enters the system at (1) and passes into a shredder unit (2). The shredder is not essential to the process but the use of a shredder is preferred if the laminated board is received in compacted form. The shredder is operated to produce board fragments some 150 mm to 300 mm square. Subdivision of the laminated board to fragments smaller than some 150 mm square should be avoided as far as possible since fine subdivision of the laminated board will generate excessive amounts of small thermoplastic fragments which then become difficult to separate from the reslushed cellulosic fibres.

From the shredder (2) the laminated board is conveyed into a digester (7) capable of withstanding the pressure, temperature and chemical conditions pertaining to the practice of the present invention. The digester (7) may be of a batch of continuous design. This does not affect the principle of the present invention.

In batchwise operation, a preferred operating mode is to simultaneously charge the laminated board from shredder (2) and liquor from tank (3) into the digester (7) via value (4). The simultaneous introduction of the liquor from tank (3) during the charging operations serves to give some wetting of the laminated board and this, in turn, aids the compaction of the laminated board into the digester (7). The compaction of the laminated board in digester (7) is further aided if the liquor from tank (3) is hot, say at a temperature between 60° C. and 95° C. The quantity of laminated board introduced per unit volume of digester (7) will be determined to some extent by the geometry of the digester vessel, a tall vessel giving better compaction of the laminated board than a more squat vessel of the same volume. However, in most instances, the quantity of laminated board (on a dry basis) introduced into the digester vessel (7) will vary between 80 kg and 180 kg per cubic metre of digester volume. The quantity of liquor introduced simultaneously with the laminated board into digester (7) should preferably be such as to give adequate submergence of the board after making allowance for the volume of steam condensate introduced during the subsequent heating stage of the operations.

The liquor introduced from tank (3) and comprising the bulk of the aqueous medium in digester (7) may be water alone. However, preferably, the water also contains quantities of dissolved alkalis or basic substances such as sodium hydroxide, sodium carbonate, sodium oleate, sodium stearate either singly or in combination. Alternatively, the liquor may also contain a dissolved acidic substance such as alum. The concentration of the dissolved substances required for the performance of the method of the present invention is related to the quantity of wet strength resin associated with the cellulosic layer of the thermoplastic laminated board. If the quantity of wet strength resin associated with the laminated board is low, then only small quantities of dissolved substances are required in the liquor. However, even with large quantities of wet strength resin associated with the laminated board, the total quantity of dissolved substances in the liquor is unlikely to exceed 50 grams of dissolved substances per liter of liquor and in most instances will be less.

In batchwise operation, after charging the digester (7) with the laminated board and the liquor or water from tank (3), the digester (7) is sealed and heating commenced. The heating may be by any of a number of known methods such as heating the external surfaces of the digester (7) or by withdrawing a portion of the liquor, heating it in an external heat exchanger and then returning the heated liquor to the digester or by similar means. A preferred method of heating is by injecting live steam directly into the base of the digester cavity. Thus, in FIG. 1, live steam from steam inlet (10) passes through valve (11) and is introduced into the base of the digester (7).

The rate of heating should be as rapid as practicable, a heatup time of a few minutes being preferable to a more prolonged approach to temperature.

The minimum digester operating temperature for the practice of the present invention is the softening point of the thermoplastic component of the laminate being processed. It has been found that at the softening point of the thermoplastic, the thermoplastic shrinks and pulls away from the underlying cellulosic layer, thus exposing the cellulosic layer to liquor penetration. The softening point of the thermoplastic and hence the minimum operating temperature within the digester will vary from carton board to carton board, depending upon the nature and composition of the particular thermoplastic involved. However, to cite a specific example, the softening point of the polyethylene used in the fabrication of a certain grade of double sided, laminated milk carton board has been found to be 105° C. Thus, for that particular grade of board, the minimum digester operating temperature would be 105° C. and so on.

The maximum temperature to which the digester contents are heated will be governed by the temperature at which undesirable hydrolytic attack occurs upon the fibres in the cellulosic substrate. In practice, the temperature of the digester contents is unlikely to exceed 200° C.

If the softening point of the thermoplastic associated with the laminate is significantly higher than 100° C., then heating the digester contents to that temperature will necessarily raise the pressure within the sealed digester to a pressure above ambient pressure. This applied steam pressure will then aid the rate of liquor penetration into the interstices of the cellulosic layer.

However, it has been found that the rate and uniformity of liquor penetration into the cellulosic layer of the laminated board can be further improved by further pressurizing the contents of the digester to a value over and above that attained by the saturated steam pressure alone. The pressure within the digester may be increased by any known means but a preferred method is by the introduction of a compressed gas.

Referring to FIG. 1, the steam inlet valve (11) is closed at the end of the heatup period and compressed gas is admitted into the digester (7) from the compressed gas tank (5) by opening valve (20). It is within the scope of the present invention for the compressed gas to be admitted prior to the heating of the digester contents but in practice, particularly if steam injection heating is used, it is preferred to admit the gas after the required digester operating temperature has been reached. Reference numeral (6) indicates an air compressor.

Suitable gases for the practice of the present invention include air, nitrogen, carbon dioxide and particulate free flue gas. When the digester liquor contains a strong alkali such as caustic soda, it is advantageous to restrict the carbon dioxide and sulphur dioxide content of the admitted gas to a level where the reactions between the admitted gas and liquor alkali components become inconsequential.

The required pressure for the admitted gas will be determined by the thickness of the cellulosic layer within the laminated board, a thicker board requiring a higher applied pressure than a thinner board to attain an acceptable rate of liquor penetration. However, in all cases, an applied gas pressure of 15 MPa or less will suffice for the practice of the preferred embodiments of the invention.

The time for which the digester contents are held at the elevated temperature and pressure will depend upon the nature of the material being treated. Thick board with a high wet strength resin content will require more time for cooking at a given temperature than a thinner laminated board with a lower wet strength resin content. During this cooking period at the elevated temperature and pressure, the water and any dissolved liquor components present attack and weaken or solubilize any wet strength resin associated with the cellulosic layer of the board. Simultaneously, the fibres of the cellulosic layer also hydrate and swell, further disrupting the integrity of the cellulosic structure. In practice, the variables of cooking temperature, applied digester pressure and the concentration of any dissolved liquor chemicals are so adjusted that the cooking period does not exceed one hour. Prolonging the cooking period beyond one hour can lead to hydrolytic damage and discolouration of the cellulosic fibres.

At the end of the cooking period, the contents of the digester (7) are cooled to a temperature below the softening point of the thermoplastic before discharge. This cooling of the digester contents is an essential feature of the method of the present invention. If the contents of the digester (7) are discharged whilst the thermoplastic is still in a softened state, then excessive comminution of the thermoplastic material occurs during the discharge process. The small fragments of thermoplastic so generated then become very difficult to separate from the reslushed cellulosic fibres. However, if the contents of the digester (7) are cooled below the softening point of the thermoplastic before discharge, then this excessive comminution is avoided.

The contents of the digester (7) may be cooled below the softening point of the thermoplastic by any known means. For example, a portion of the cooking liquor may be withdrawn from the digester, cooled in an external heat exchanger and the cooled liquor then returned to the digester. Or, alternatively, cold water contained in storage tank (17) may be admitted to the digester (7) by opening valve (21). However, if the thermoplastic material associated with the laminate being treated has a softening point above 100° C., then a preferred method of cooling of the digester contents is by application of the principle of evaporative cooling.

The principle of evaporative cooling is applied by closing the compressed gas line valve (20) and then venting the digester (7) by opening the valve (8). The gas escapes from the digester cavity and as the pressure within the digester (7) is reduced, the liquor within digester (7) begins to boil. As the boiling proceeds, the temperature of the digester contents is progressively reduced. The process of boiling and concomitant evaporative cooling ceases once the pressure in the digester cavity reaches atmospheric. At this stage, the temperature of the digester contents has been reduced to some 100° C.

A preferred unit of equipment downstream of valve (8) is a cyclone (9). The cyclone (9) disengages any entrained liquor and/or solids from the gaseous stream. The entrained liquor and/or solids are discharged into the stirred tank (15) whilst the gas and steam are vented to atmosphere. Alternatively, the gas escaping from the cyclone (9) may be recycled to the compressed gas tank (5).

After cooling, the contents of digester (7) are discharged into the stirred tank (15). If the digester has been cooled by venting to atmospheric pressure, then valve (14) may be opened and the digester contents discharged by gravity. The gravity discharge may be further aided by introducing wash water into the digester via valve (21). Gravity discharge produces a minimum of defibration of the cellulosic material during the discharge process and the bulk of the defibration is achieved by subsequent mechanical agitation in the stirred tank (15).

If the digester contents have been cooled below the softening point of the thermoplastic by venting to atmospheric pressure, an alternative method of discharging the digester is to repressurize the digester cavity by closing valve (8) and opening valve (20) to admit further compressed gas. When valve (14) is then opened, a more violent discharge of the contents of the digester (7) into the stirred tank (15) is obtained than by gravity discharge alone. A gas pressure aided discharge of the digester contents produces more defibration of the cellulosic material than a gravity discharge.

If a gas pressurized discharge method is used, it is preferred to restrict the pressure of the gas admitted to the digester to a value of 4 MPa or less. Higher discharge pressures will tend to give excessive fragmentation of the thermoplastic material even though the thermoplastic material has been cooled below the softening point. Also, with a gas pressurized discharge mode, care should be taken in the design of the digester discharge line to avoid unnecessary constrictions and any rapid changes of direction which would bring intense shear forces to bear upon the thermoplastic material. Intense shear forces will serve to fragment the thermoplastic material into small pieces which are then again difficult to screen out of the reslushed cellulosic fibres.

Although not shown in FIG. 1, if a gas pressurized digester discharge scheme is adopted, then a cyclone separator between valve (14) and the stirred tank (15) may be a further preferred unit of equipment. The cyclone separator would disengage the liquor and solids from the discharged gas. The liquor and solids would be directed into the stirred tank (15) and the gas would either be vented to atmosphere or collected and recompressed and returned to the compressed gas tank (5).

The material discharged into the stirred tank (15) will be a mixture of liberated fibres, undefibrated cellulosic fragments and the thermoplastic component of the laminate. The defibration of the cellulosic fragments is completed by mechanical agitation. The agitator should have rounded leading edges to the blades to avoid cutting the thermoplastic. If the laminate has been adequately cooked, a gentle stirring action will complete the defibration in a few minutes. The solids consistency within the stirred tank (15) should be adjusted by dilution with water to give a readily stirred mixture. In practice the solids consistency in tank (15) should preferably be adjusted to between 1 and 8 wt per cent solids.

A characteristic of the method of the present invention is that the thermoplastic component of the laminates tends to assume a fibrillar structure as a result of the treatment. Hence the agitator in the stirred tank (15) should be flush mounted with the wall of the tank to avoid the thermoplastic fibrils wrapping around the rotating shaft.

The wrap around tendency of the thermoplastic may be used to advantage by introducing a length of barbed wire or similar material into the stirred tank (15) towards the end of the defibration period. The thermoplastic will wrap around the barbed wire and may be pulled out of the stirred tank together with the barbed wire. Removing some of the thermoplastic in this manner reduces the load on the screens in the subsequent pulp cleaning operations.

The reslushed pulp discharged from the stirred tank (15) via valve (18) may be cleaned of the remaining thermoplastic by known means. In practice, a vibrating slotted screen 16 of 0.25 mm slot width has been found satisfactory for removing the majority of the remaining thermoplastic material although this is not the only type of screen by which the separation may be achieved. The screen oversize 12 is enriched in thermoplastic material and represents the rejects from the process. The screen undersize 13 is substantially clean cellulosic fibres and represents the product of the method of the present invention.

The method of the present invention is further illustrated by the following specific example of processing double sided, polyethylene laminated milk carton board according to the invention.

EXAMPLE 1

The milk carton board feed material had a total thickness of 0.67 mm and was faced on both sides by polyethylene films of 0.02 mm thickness. The polyethylene had a softening point of 105° C. The cellulosic core layer was bonded with wet strength resin and contained some clay filler.

The milk carton board was charged into a batch digester with sufficient liquor containing 10 g/l of dissolved caustic soda to fully submerge the board. The heatup time to the cooking temperature of 120° C. was 6.5 minutes and the contents of the digester were further retained at 120° C. for 10 minutes under an applied nitrogen pressure of 2.1 MPa.

After venting to atmospheric pressure to cool the digester contents to 100° C., the digester was repressurized to 0.7 MP with nitrogen gas and the digester contents discharged. The cooked board was further defibrated by mechanical agitation in a slurry of 3% solids consistency before screening over a 0.25 mm slotted screen.

The screen accepts contained a negligibly small quantity (less than 0.1% by weight) of polyethylene. An unbeaten handsheet of 60 g/m² substance made from the recovered fibre had the following properties:

| | |
|---|---|
| Freeness: | 594 C.s.f. |
| Tear Index: | 11.9 |
| Breaking Length: | 3.0 km |
| Burst Index: | 1.5 |
| Bulk: | 2.08 |
| Brightness: | 62.1 |

The overall fibre recovery as reslushed pulp was higher than 90% of the quantity of fibres originally present in the feed material.

We claim:

1. A method for recovering cellulosic fibres from a laminate having a cellulosic fibre layer and a layer of thermoplastic material, which method comprises the steps of:
   (i) placing the laminate in contact with a pulping liquor, to provide a liquor-laminate system,
   (ii) pressurizing and heating the liquor-laminate system to a temperature greater than or equal to the softening point of the thermoplastic material and maintaining this temperature for a time to sufficiently weaken the laminate structure,
   (iii) cooling the liquor-laminate system to a temperature below the softening point of the thermoplastic material,
   (iv) subjecting the cooled liquor-laminate system to defibration forces to provide a mixture of thermoplastic fragments and cellulosic fibres, and
   (v) separating the thermoplastic fragments from the cellulosic fibres to thereby recover the cellulosic fibres.

2. A method for recovering cellulosic fibres as claimed in claim 1, wherein the pulping liquor is heated prior to being brought into contact with the laminate.

3. A method for recovering cellulosic fibres as claimed in claim 1, wherein the defibration forces are provided by controlled mechanical agitation of the laminate.

4. A method for recovering cellulosic fibres as claimed in claim 1, wherein the laminate is fragmented into fragments from 150 mm to 300 mm square prior to contact with the pulping liquor.

5. A method for recovering cellulosic fibres as claimed in claim 1, wherein the defibration forces are provided by rapid discharge of the laminate to a lower pressure environment.

6. A method for recovering cellulosic fibres as claimed in claim 1, wherein the cooling is accomplished by evaporative cooling.

7. A method for recovering cellulosic fibres as claimed in claim 1 and wherein the liquor-laminate system is pressurized prior to the heating step.

8. A method for recovering cellulosic fibres as claimed in claim 7, wherein the system is pressurized by heating the liquor-laminate in a closed space.

9. A method for recovering cellulosic fibres as claimed in claim 7, wherein the pulping liquor is heated prior to being brought into contact with the laminate.

10. A method for recovering cellulosic fibres as claimed in claim 7, wherein the defibration forces are provided by controlled mechanical agitation of the laminate.

11. A method for recovering cellulosic fibres as claimed in claim 7, wherein the laminate is fragmented into fragments from 150 mm to 300 mm square prior to contact with the pulping liquor.

12. A method for recovering cellulosic fibres as claimed in claim 7, wherein the system is pressurized by introducing a compressed gas.

13. A method for recovering cellulosic fibres as claimed in claim 7, wherein the system is pressurized by a combination of heating the liquor-laminate in a closed space and introducing a compressed gas.

14. A method for recovering cellulosic fibres as claimed in claim 7, wherein the defibration forces are provided by rapid discharge of the laminate to a lower pressure environment.

15. A method for recovering cellulosic fibres as claimed in claim 1 and wherein the liquor-laminate system is pressurized simultaneously with the heating step.

16. A method for recovering cellulosic fibres as claimed in claim 15, wherein the system is pressurized by heating the liquor-laminate in a closed space.

17. A method for recovering cellulosic fibres as claimed in claim 15, wherein the pulping liquor is heated prior to being brought into contact with the laminate.

18. A method for recovering cellulosic fibres as claimed in claim 15, wherein the defibration forces are provided by controlled mechanical agitation of the laminate.

19. A method for recovering cellulosic fibres as claimed in claim 15, wherein the laminate is fragmented into fragments from 150 mm to 300 mm square prior to contact with the pulping liquor.

20. A method for recovering cellulosic fibres as claimed in claim 15, wherein the system is pressurized by introducing a compressed gas.

21. A method for recovering cellulosic fibres as claimed in claim 15, wherein the system is pressurized by a combination of heating the liquor-laminate in a closed space and introducing a compressed gas.

22. A method for recovering cellulosic fibres as claimed in claim 15, wherein the defibration forces are provided by rapid discharge of the laminate to a lower pressure environment.

23. A method for recovering cellulosic fibres as claimed in claim 1 and wherein the liquor-laminate system is pressurized subsequent to the heating step.

24. A method for recovering cellulosic fibres as claimed in claim 23, wherein the system is pressurized by heating the liquor-laminate in a closed space.

25. A method for recovering cellulosic fibres as claimed in claim 23, wherein the pulping liquor is heated prior to being brought into contact with the laminate.

26. A method for recovering cellulosic fibres as claimed in claim 23, wherein the defibration forces are provided by controlled mechanical agitation of the laminate.

27. A method for recovering cellulosic fibres as claimed in claim 23, wherein the laminate is fragmented into fragments from 150 mm to 300 mm square prior to contact with the pulping liquor.

28. A method for recovering cellulosic fibres as claimed in claim 23, wherein the system is pressurized by introducing a compressed gas.

29. A method for recovering cellulosic fibres as claimed in claim 23, wherein the system is pressurized by a combination of heating the liquor-laminate in a closed space and introducing a compressed gas.

30. A method for recovering cellulosic fibres as claimed in claim 23, wherein the defibration forces are provided by rapid discharge of the laminate to a lower pressure environment.

* * * * *